(12) United States Patent
Chuang et al.

(10) Patent No.: US 7,378,824 B2
(45) Date of Patent: May 27, 2008

(54) VOLTAGE CONVERTER CAPABLE OF AVOIDING VOLTAGE DROP OCCURRING IN INPUT SIGNAL

(75) Inventors: Ming-Nan Chuang, Hsin-Chu (TW); Meng-Chi Chiang, Hsin-Chu (TW); Yi-Shan Chu, Hsin-Chu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 69 days.

(21) Appl. No.: 11/420,485

(22) Filed: May 26, 2006

(65) Prior Publication Data

US 2007/0273347 A1    Nov. 29, 2007

(51) Int. Cl.
G05F 1/40 (2006.01)
G05F 1/56 (2006.01)

(52) U.S. Cl. .................. 323/282; 323/285

(58) Field of Classification Search .......... 323/222, 323/223, 225, 265, 268, 271, 280, 281, 282, 323/284, 285

See application file for complete search history.

(56) References Cited

U.S. PATENT DOCUMENTS

| | | | | |
|---|---|---|---|---|
| 4,428,015 A | * | 1/1984 | Nesler | 361/18 |
| 5,852,557 A | * | 12/1998 | Woodward | 363/124 |
| 6,157,176 A | * | 12/2000 | Pulvirenti et al. | 323/266 |
| 6,204,644 B1 | * | 3/2001 | Otake | 323/222 |
| 6,509,722 B2 | * | 1/2003 | Lopata | 323/280 |
| 7,071,664 B1 | * | 7/2006 | Teggatz et al. | 323/280 |

* cited by examiner

Primary Examiner—Matthew V Nguyen
(74) Attorney, Agent, or Firm—Winston Hsu

(57) ABSTRACT

A voltage converter for providing an output voltage signal at an output port according to an input voltage signal is disclosed. The voltage converter comprises a feedback circuit, a transmission switch circuit, a voltage converting circuit, and a pre-bias circuit. The feedback circuit generates a feedback voltage signal according to the output voltage signal. The transmission switch circuit selectively transmits a converted voltage signal to the output port of the voltage converter in a normal mode or transmits the input voltage signal to the output port of the voltage converter in a pre-bias mode. The voltage converting circuit converts the input voltage signal into the converted voltage signal in the normal mode and references the feedback voltage signal and the reference voltage signal to adjust the output voltage signal in the normal mode. The pre-bias circuit controls a magnitude of a current passing through the transmission switch circuit.

34 Claims, 11 Drawing Sheets

VOLTAGE CONVERTER CAPABLE OF AVOIDING VOLTAGE DROP OCCURRING IN INPUT SIGNAL

BACKGROUND OF THE INVENTION

1. Field of the Invention

The present invention relates to a voltage converter, and more particularly, to a voltage converter capable of avoiding a voltage drop occurring in an input signal.

2. Description of the Prior Art

Please refer to FIG. 1. FIG. 1 is a diagram of a prior art converter 100. As shown in FIG. 1, the voltage converter 100 includes an inductor L, a feedback circuit 102, a voltage converting circuit 104, and a transistor $Q_p$. The voltage converter 100 is used as a DC/DC converter for boosting a voltage level of an input voltage signal $V_{in}$ and is coupled to an enable signal EN, wherein the enable signal EN is used to start the voltage converter 100. The voltage converting circuit 104 comprises an error amplifier $OP_1$, a PWM (Pulse Width Modulation) control loop 106, and a transistor $Q_n$. The PWM control loop 106 generates a plurality of voltage control signals $S_n$ and $S_p$ to control the conductance of the transistors $Q_n$ and $Q_p$ respectively. The voltage control signals $S_n$ and $S_p$ are complementary to each other, and their duty cycles are controlled by an output of the error amplifier $OP_1$ (i.e. $V_{err}$). The inverting node of the error amplifier $OP_1$ is used to receive a feedback voltage signal $V_{fb}$, and the non-inverting node of the error amplifier $OP_1$ is utilized for receiving a reference voltage signal $V_{ref}$, wherein the feedback voltage signal $V_{fb}$ corresponds to an output voltage signal $V_{out}$, and the reference voltage signal $V_{ref}$ is a voltage signal whose voltage level increases with time after start-up and is provided by an external circuit (not shown in FIG. 1). For example, the reference voltage signal $V_{ref}$ is a linear signal in general. Additionally, the output voltage signal $V_{out}$ is used as an input signal of the load 108. The output of the error amplifier $OP_1$ (i.e. $V_{err}$) responds to the difference between the feedback voltage signal $V_{fb}$ and the reference voltage signal $V_{ref}$ to control duty cycles of voltage control signals $S_n$ and $S_p$ that control on/off states of transistors $Q_n$ and $Q_p$, and then a voltage level of the output voltage signal $V_{out}$ will be stabilized. When the voltage level of the output voltage signal $V_{out}$ is stabilized, the following equation is established:

$$V_{out} = V_{ref} \times \frac{(R_1 + R_2)}{R_2} \qquad \text{Equation (1)}$$

wherein $R_1$ and $R_2$ are resistors in the feedback circuit 102.

However, even though the voltage levels of voltage control signals $S_n$ and $S_p$ remain at a low voltage level and a high voltage level, respectively, a large amount of leakage current is still formed. This is because a body diode exists on the transistor $Q_p$ and is forward-biased to induce the leakage current. For example, a voltage level of the input voltage signal $V_{in}$ is 3.3 volts and the body voltage of the body diode is 0.7V, and a voltage level of the output voltage signal $V_{out}$ becomes 2.6V when the voltage levels of voltage control signals $S_n$ and $S_p$ remain at a low voltage level and a high voltage level respectively. Any integrated circuits, represented by the load 108 shown in FIG. 1 and coupled to the output voltage signal $V_{out}$, may be erroneously activated since the voltage level of the output voltage signal $V_{out}$, 2.6V is not equal to zero; furthermore, the non-zero voltage level of the output voltage signal $V_{out}$ may provide the load 108 with a huge amount of static current leaked from the forward-biased body diode of the transistor $Q_p$. For a mobile device using a single battery as its power supply, the above-mentioned condition would consume electric energy of the battery when the mobile device is not operating or idle.

Two prior art methods are provided for solving the above-mentioned problem. A first prior art method is to add a load switch between the transistor $Q_p$ and the load 108 to control if the electrical connection is established, where the load switch has a transistor with a body diode having a p-type region coupled to the load and an n-type region coupled to the preceding transistor $Q_p$. The load switch is able to block the leakage current from being leaked through the forward-biased body diode of the transistor $Q_p$ to the load 108. However, in practice, the additional load switch increases both cost and area of the printed circuit board (PCB). Furthermore, the load switch lowers the energy transfer efficiency since the load switch itself actually consumes energy when conducting current due to inherent resistance.

In general, a second prior art method is often used to solve the leakage current problem caused by the forward-biased body diode. Please refer to FIG. 2 and FIG. 3. FIG. 2 is a diagram of another prior art converter 200. FIG. 3 is a timing diagram illustrating the operation of the prior art converter 200 shown in FIG. 2. As shown in FIG. 2, the voltage converter 200 includes an inductor L, a feedback circuit 202, a voltage converting circuit 204, a transmission switch 206, and a switch signal generator 208, wherein the voltage converting circuit 204 comprises an error amplifier $OP_1$, a PWM control loop 210, and a transistor $Q_n$. The operations and functions of the feedback circuit 202, the voltage converting circuit 204, and the PWM control loop 210 are the same as those of the above-mentioned feedback circuit 102, voltage converting circuit 104, and PWM control loop 106. Further description is therefore not included for brevity. The voltage converter 200 is coupled to an enable signal EN, which is used to start the voltage converter 200, and the output voltage signal $V_{out}$ is used as an input signal of the load 212. The transmission switch 206 includes a transistor $Q_p$, a first switch $S_1$, and a second switch $S_2$. The switch signal generator 208 respectively generates a first switch control signal $C_1$ and a second switch control signal $C_2$ to control the on/off statuses of the first switch $S_1$ and second switch $S_2$.

As shown in FIG. 3, before the voltage converter 200 is started, the first switch control signal $C_1$ keeps a high logic level and a second switch control signal $C_2$ keeps a low logic level, so the status of the first switch $S_1$ is on (i.e. closed) and the status of the second switch $S_2$ is off (i.e. open). Therefore, a PN junction is established between the body and the drain of the first transistor $Q_p$ where a p-type region is the drain and the n-type region is the body. No leakage current is allowed to be passed to the load 212 when the voltage control signals $S_n$ and $S_p$ are logic low and logic high respectively because the diode is reverse biased. When the voltage converter 200 is started by the enable signal EN at time $T_1$ (i.e. a logic level of the enable signal EN is changed from a low logic level to a high logic level), the first switch control signal $C_1$ changes from the high logic level to a low logic level and the second switch control signal $C_2$ changes from the low logic level to a high logic level, so the status of the first switch $S_1$ is changed to be off and the status of the second switch $S_2$ is changed to be on. In this moment, a PN junction is established between the body and the source of the first transistor $Q_p$ where a p-type region is the source and the n-type region is the body. At the same time, the voltage level of the reference voltage signal $V_{ref}$ increases slowly from zero volts to a default value (e.g. 1.25 volts) according to the design of the feedback circuit 202. At this time, the voltage difference between voltage levels of the output of the voltage converting circuit 204 (i.e. $V_{in}'$) and of the output voltage signal $V_{out}$ is large even though a body voltage $V_d$ occurs at the body of the transistor $Q_p$. The output capacitor $C_{out}$ is then immediately charged with a large inrush current to make the voltage level of the output voltage signal $V_{out}$ equal to the output of the voltage converting circuit 204 (i.e. $V_{in}'$) minus the body voltage $V_d$ at time $T_2$. After time $T_2$, because the feedback voltage signal $V_{fb}$ still follows the reference voltage signal $V_{ref}$, the voltage level of the output voltage signal $V_{out}$ increases slowly from the voltage level of the output of the voltage converting circuit 204 (i.e. $V_{in}'$) minus the body voltage $V_d$ to a stable value (e.g. 5 volts) at time $T_3$. Therefore, the transistor $Q_p$ conducts slowly during the period from time $T_2$ to $T_3$; however, a large inrush input current $I_{in}$ during time $T_1$ to $T_2$ cannot be decreased. This will result in a voltage drop in the input voltage signal $V_{in}$ (shown in FIG. 3). In a battery, if the situation of the voltage drop in the input voltage signal $V_{in}$ is significant, other systems whose energy are provided by the battery may be activated at an inappropriate moment.

SUMMARY OF THE INVENTION

Therefore one of the objectives of the present invention is to provide a voltage converter and related method for avoiding an inrush input current in an input signal to solve the above-mentioned problem.

According to the claimed invention, a voltage converter for providing an output voltage signal at an output port according to an input voltage signal is disclosed. The voltage converter includes a feedback circuit, a transmission switch circuit, a voltage converting circuit, and a pre-bias circuit. The feedback circuit is utilized for generating a feedback voltage signal according to the output voltage signal. The transmission switch circuit is used to transmit a converted voltage signal to the output port of the voltage converter in a normal mode of the voltage converter or the input voltage signal to the output port of the voltage converter in a pre-bias mode of the voltage converter selectively. The voltage converting circuit, coupled to the input voltage signal, the feedback voltage signal, a reference voltage signal, and the transmission switch circuit, is utilized for converting the input voltage signal into the converted voltage signal in the normal mode and referencing the feedback voltage signal and the reference voltage signal to adjust the output voltage signal in the normal mode by controlling the transmission switch. The pre-bias circuit, coupled to the feedback signal, the reference voltage signal, and the transmission switch circuit, is used to control a magnitude of a current passing through the transmission switch to the output port in the pre-bias mode.

According to the claimed invention, a voltage converting method for providing an output voltage signal at an output port according to an input voltage signal is disclosed. The voltage converting method comprises: (a) generating a feedback voltage signal according to the output voltage signal; (b) providing a transmission switch circuit and utilizing the transmission switch circuit for selectively transmitting a converted voltage signal to the output port in a normal mode or transmitting the input voltage signal to the output port in a pre-bias mode; (c) in the normal mode, converting the input voltage signal into the converted voltage signal in the normal mode and referencing the feedback voltage signal and the reference voltage signal to adjust the output voltage signal by controlling the transmission switch; and (d) in the pre-bias mode, controlling a magnitude of a current passing through the transmission switch to the output port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
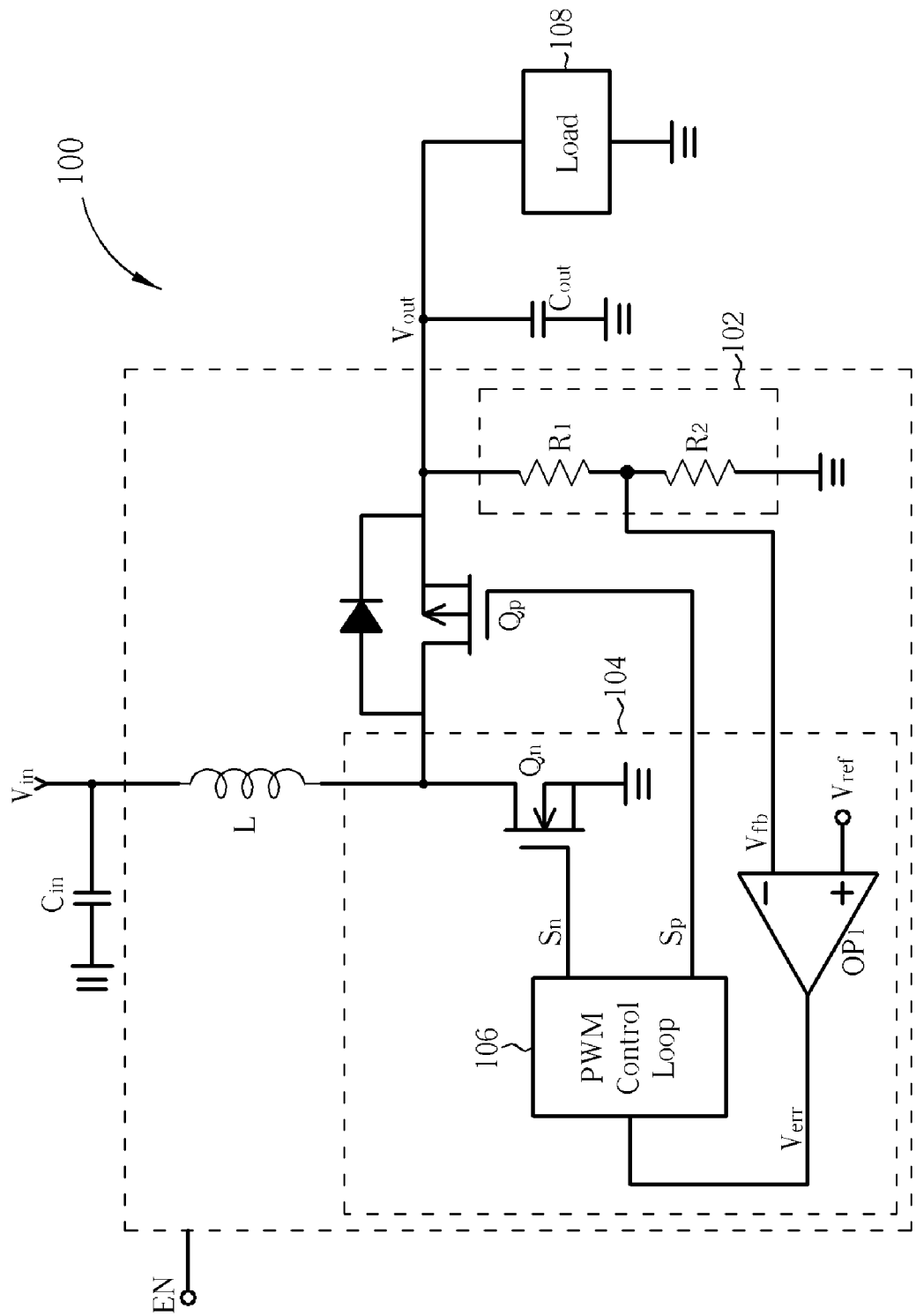
FIG. 1 is a diagram of a first prior art converter.
Figure 2:
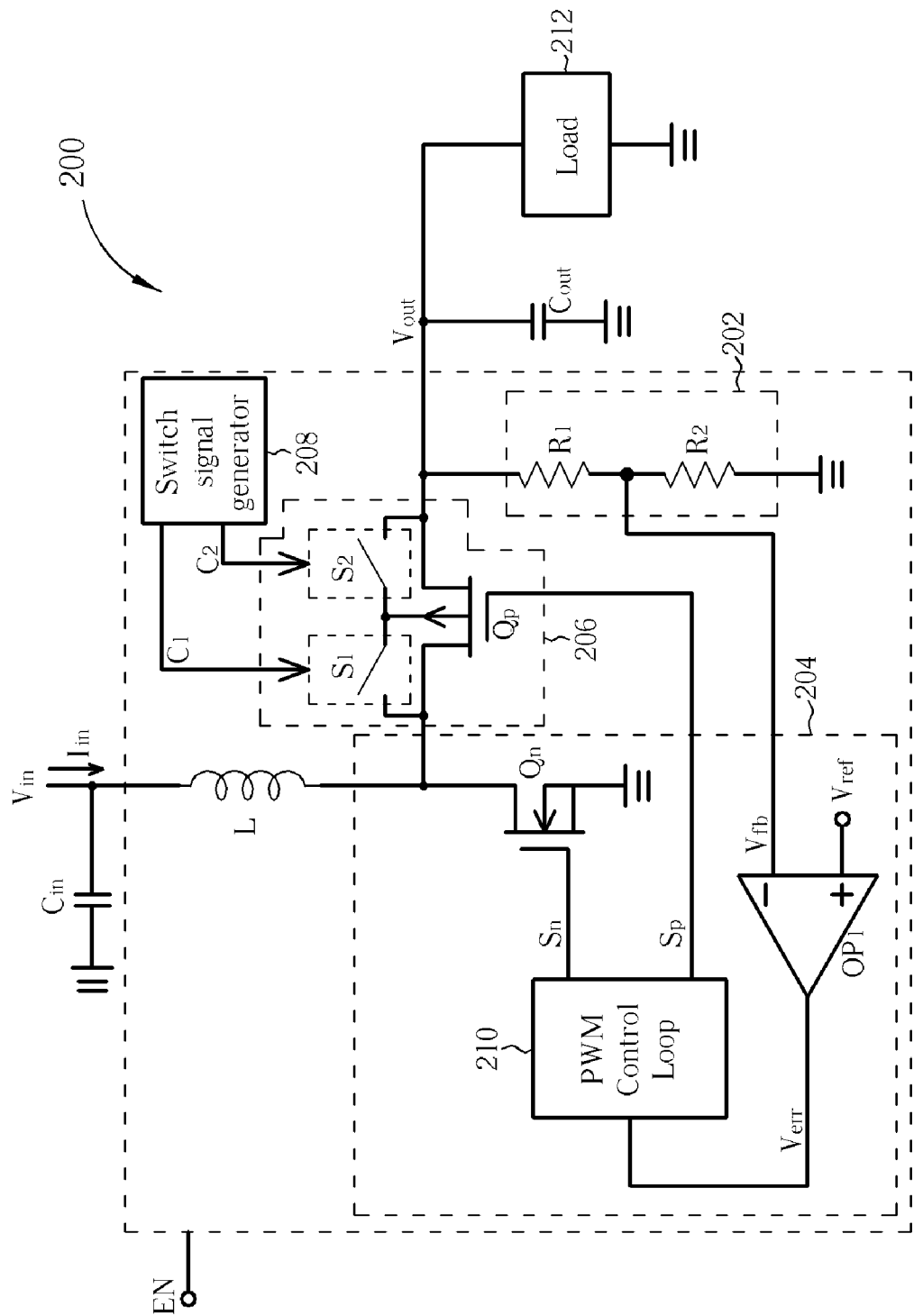
FIG. 2 is a diagram of a second prior art converter.
Figure 3:
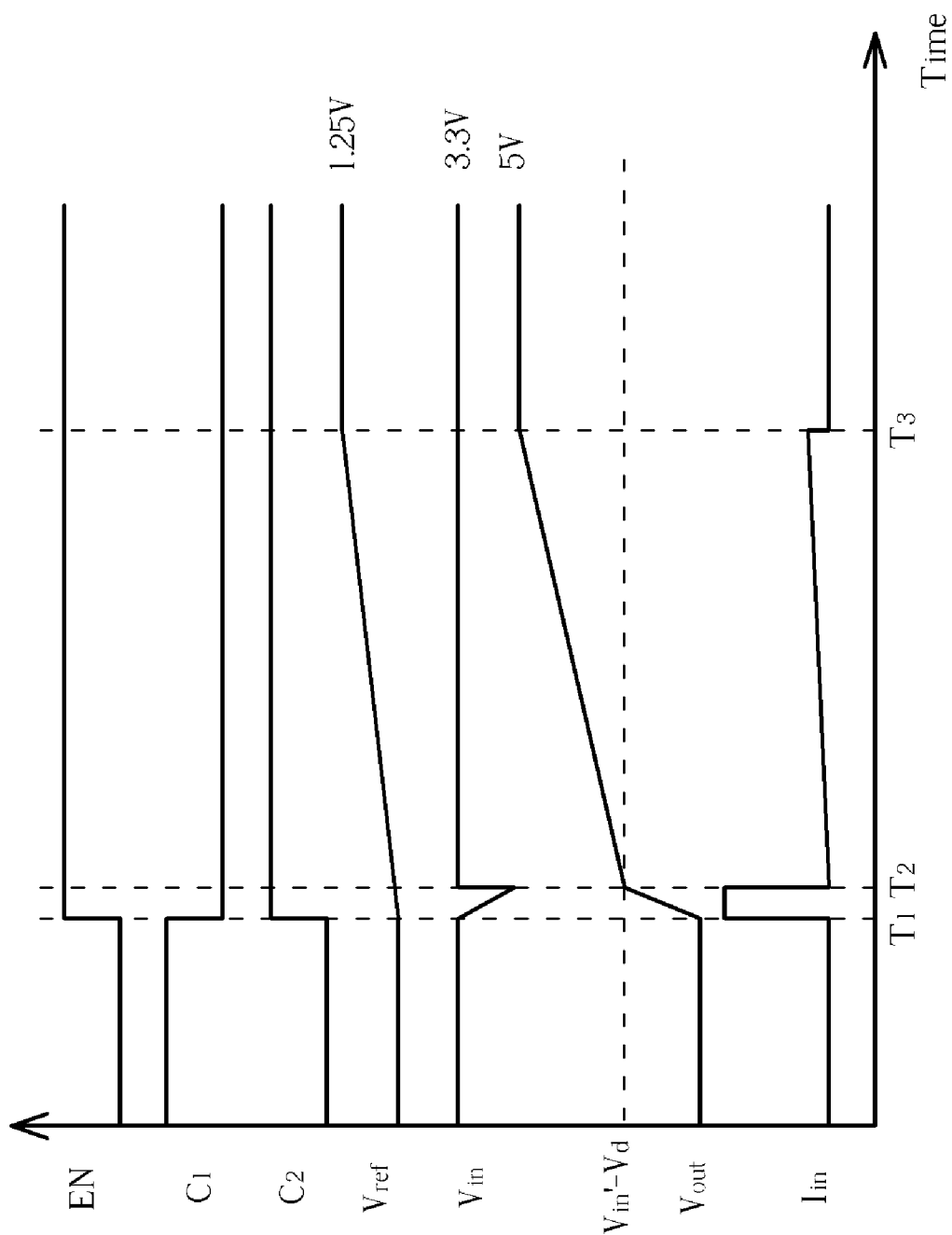
FIG. 3 is a timing diagram illustrating the operation of the prior art converter shown in FIG. 2.
Figure 4:
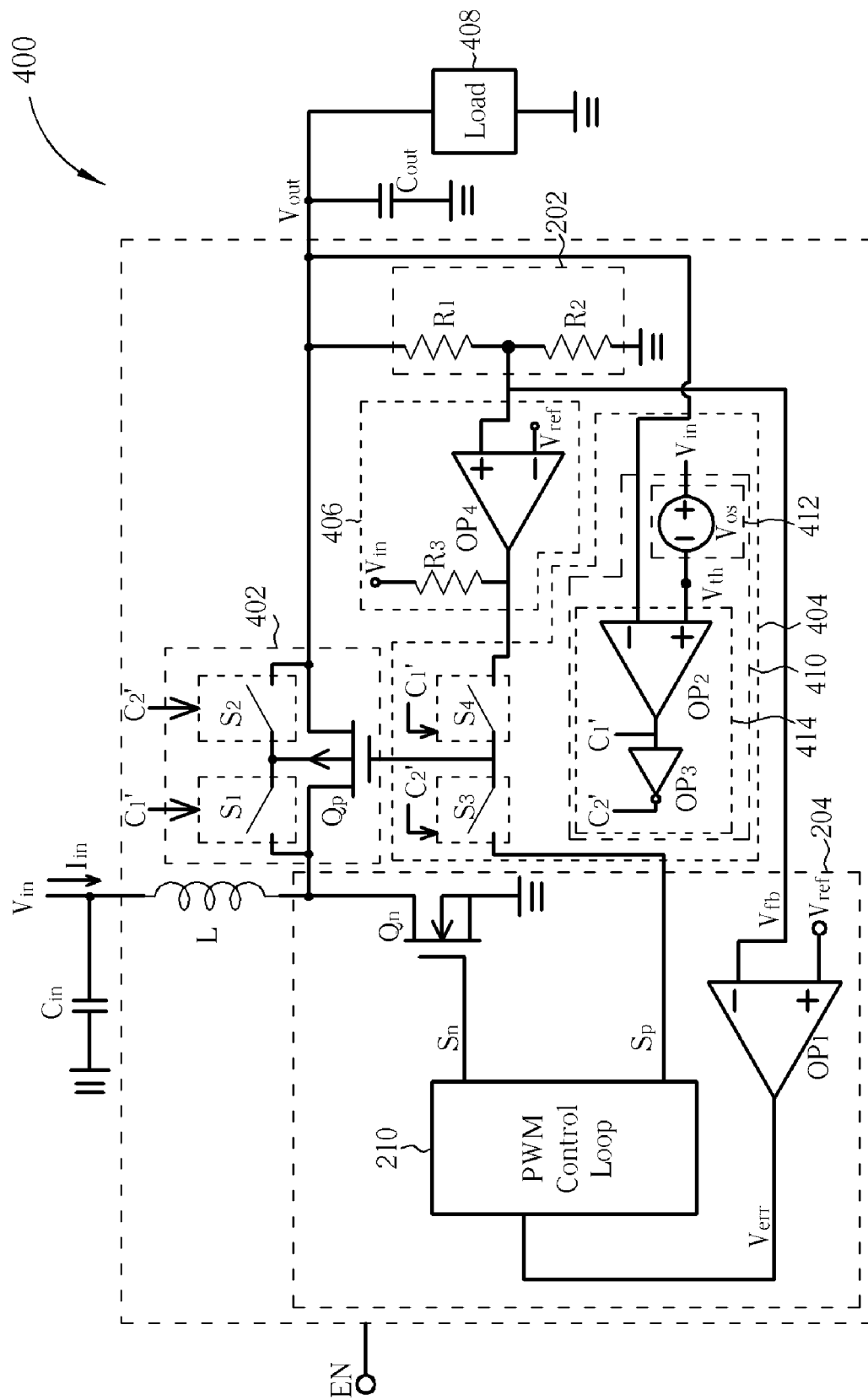
FIG. 4 is a diagram of a voltage converter according to a first embodiment of the present invention.
Figure 5:
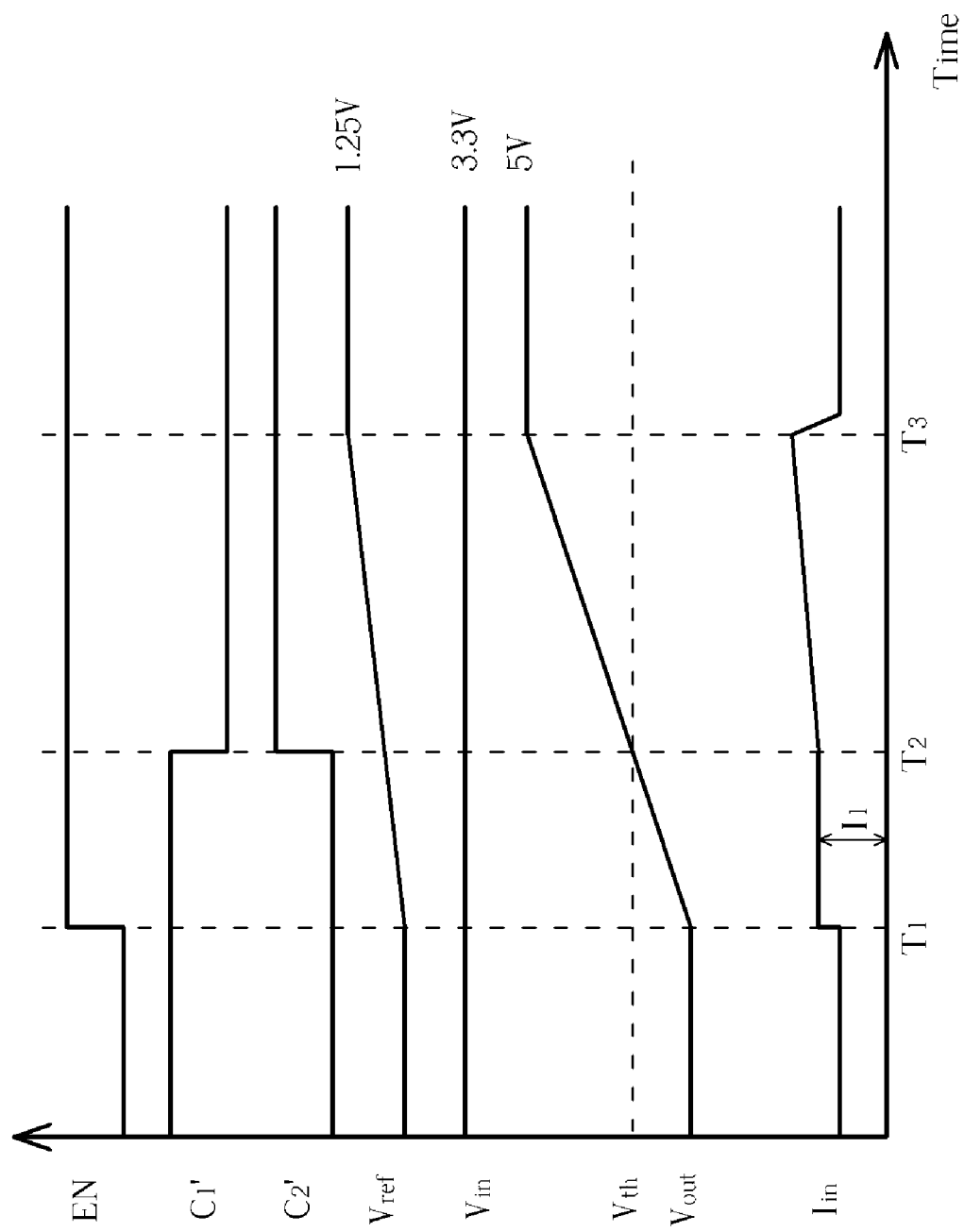
FIG. 5 is a timing diagram illustrating the operation of the voltage converter shown in FIG. 4.

Please refer to FIG. 4 and FIG. 5. FIG. 4 is a diagram of a voltage converter 400 according to a first embodiment of the present invention. FIG. 5 is a timing diagram illustrating the operation of the voltage converter 400 shown in FIG. 4. As shown in FIG. 4, the voltage converter 400 comprises a feedback circuit 202, a voltage converting circuit 204, a transmission switch circuit 402, a control switch circuit 404, and a pre-bias circuit 406. The voltage converter 400 is utilized for providing a stable voltage level for the load 408. The operations and functions of the feedback circuit 202 and voltage converting circuit 204 are identical to that mentioned above, and further description is therefore not detailed for brevity. The transmission switch circuit 402 includes a first transistor $Q_p$, a first switch $S_1$, and a second switch $S_2$, wherein the first transistor $Q_p$ is a PMOS transistor, the first switch $S_1$ is controlled by a first switch control signal $C_1'$ generated by the control switch circuit 404, and the second switch $S_2$ is controlled by a second switch control signal $C_2'$ generated by the control switch circuit 404. The control switch circuit 404 includes a third switch $S_3$, a fourth switch $S_4$, and a switch controller 410, wherein the switch controller 410 is utilized for controlling on/off status of each of the first, second, third, and fourth switches $S_1$, $S_2$, $S_3$, and $S_4$ to allow the voltage converting circuit 204 to control the transmission switch circuit 402 in a normal mode or allow the pre-bias circuit 406 to control the transmission switch circuit 402 in a pre-bias mode, selectively. The switch controller 410 comprises a threshold voltage providing circuit 412 and a switch control circuit 414. The threshold voltage providing circuit 412, coupled to the input voltage signal $V_{in}$, comprises a voltage source $V_{os}$ and is utilized for outputting a threshold voltage signal $V_{th}$, wherein a voltage level of the threshold voltage signal $V_{th}$ is equal to the input voltage signal $V_{in}$ minus a voltage level of the voltage source $V_{os}$. Additionally, the switch control circuit 414 comprises a comparator $OP_2$ and an inverter $OP_3$. The switch control circuit 414 references the threshold voltage signal $V_{th}$ and the output voltage signal $V_{out}$ to generate a first switch control signal $C_1'$ to control on/off status of each of the first and fourth switches $S_1$ and $S_4$, and to generate a second switch control signal $C_2'$ to control on/off status of each of the second and third switches $S_2$ and $S_3$. The pre-bias circuit 406 comprises a resistor $R_3$ and an error amplifier $OP_4$, wherein the resistor $R_3$ is coupled to the input voltage signal $V_{in}$ and the output of the error amplifier $OP_4$. The error amplifier $OP_4$ is utilized for referencing the feedback voltage signal $V_{fb}$ and the reference voltage signal $V_{ref}$ to control current passing through the transmission switch circuit 402 to the output port of the voltage converter 400 in the pre-bias mode.

In this and the following embodiments, we assume that the voltage level of the input voltage signal $V_{in}$ is 3.3 volts, the voltage level of the reference voltage signal $V_{ref}$ increases with time from zero volts to 1.25 volts when the voltage converter 400 is started, and the voltage level of the output voltage signal $V_{out}$ will remain a stable value (e.g. 5 volts) finally according to the design of the feedback circuit 202. As shown in FIG. 5, before the voltage converter 400 is started, the logic level of the first switch control signal $C_1'$ keeps a high logic level and the logic level of the second switch control signal $C_2'$ keeps a low logic level. This causes the statuses of the first switch $S_1$ and fourth switch $S_4$ to be on, and statuses of the second switch $S_2$ and third switch $S_3$ to be off. The first transistor $Q_p$ is not conducting since the gate of the first transistor $Q_p$ is connected to a high logic level provided by the input voltage signal $V_{in}$ through the resistor $R_3$. Therefore, before the voltage converter 400 is started, the voltage level of the output voltage signal $V_{out}$ maintains zero volts and no leakage current exists. When the voltage converter 400 is started by the enable signal EN at time $T_1$ (i.e. a logic level of the enable signal EN changes from a low logic level to a high logic level) shown in FIG. 5, the voltage converter 400 firstly enters the pre-bias mode, and the voltage level of the reference voltage signal $V_{ref}$ increases with time from zero volts. Because the logic level of the first switch control signal $C_1'$ keeps a high logic level and the logic level of the second switch control signal $C_2'$ keeps a low logic level, statuses of the first switch $S_1$ and fourth switch $S_4$ still remain on, and statuses of the second switch $S_2$ and third switch $S_3$ still remain off. A PN junction is established between the body and the drain of the first transistor $Q_p$ where the p-type region is the drain and the n-type region is the body; although the PN junction is reverse biased, a current can still pass through the first transistor $Q_p$. The pre-bias circuit 406 is thus responsible for controlling the conductance of the transmission switch circuit 402 (i.e. the conductance of the first transistor $Q_p$). Because of the operation of the error amplifier $OP_4$, the voltage level of the feedback voltage signal $V_{fb}$ increases with an increase of the voltage level of the reference voltage signal $V_{ref}$, and the first transistor $Q_p$ then conducts slowly. Consequently the output capacitor $C_{out}$ is charged with the small input current $I_{in}$ through the first transistor $Q_p$ until the voltage level of the output voltage signal $V_{out}$ equals the voltage level of the threshold voltage signal $V_{th}$. The threshold voltage signal $V_{th}$ is utilized to define the time of exiting the pre-bias mode. The voltage level of the threshold voltage signal $V_{th}$ is usually designed as a voltage value between zero volts and the input voltage $V_{in}$ according to design requirements.

When the voltage level of the output voltage signal $V_{out}$ is equal to the voltage level of the threshold voltage signal $V_{th}$ at time T2, the voltage converter 400 enters the normal mode. The switch controller 404 changes the first switch control signal $C_1'$ from a high logic level to a low logic level and changes the second switch control signal $C_2'$ from a low logic level to a high logic level according to the comparator $OP_2$ and inverter $OP_3$ in the switch control circuit 414. Therefore, statuses of the first switch $S_1$ and fourth switch $S_4$ both change from on to off, and statuses of the second switch $S_2$ and third switch $S_3$ both change from off to on. At this time, a PN junction is established between the body and the source of the first transistor $Q_p$ where the p-type region is the source and the n-type region is the body; the PN junction is forward biased. The voltage converting circuit 404 is responsible for controlling the conductance of the transmission switch circuit 402. The error amplifier $OP_1$ then acts in response to the difference between the reference voltage signal $V_{ref}$ and feedback voltage signal $V_{fb}$ to control the duty cycles of the transmission switch circuit 402 and the transistor $Q_n$ until the voltage level of the output voltage signal $V_{out}$ is equal to the final stable value according to the design of the feedback circuit 202 (e.g. 5 volts). The reason for entering the pre-bias mode before the normal mode is that the output capacitor $C_{out}$ can be charged with a small input current $I_1$ first in the pre-bias mode until the voltage level of the output voltage signal $V_{out}$ reaches the voltage level of the threshold voltage signal $V_{th}$.

When the voltage level of the output voltage signal $V_{out}$ reaches the voltage level of the threshold voltage signal $V_{th}$, the voltage converter 400 enters the normal mode. The output capacitor $C_{out}$ will be charged with a current that may be larger than the input current in the pre-bias mode, and the voltage level of the input voltage signal $V_{in}$ remains roughly flat while the voltage difference between the stable value (i.e. 5 volts) and the voltage level of the threshold voltage signal $V_{th}$ is small enough to not result in a large input current in the normal mode. As a result, a serious voltage drop in the input voltage signal $V_{in}$ is avoided.

Figure 6:
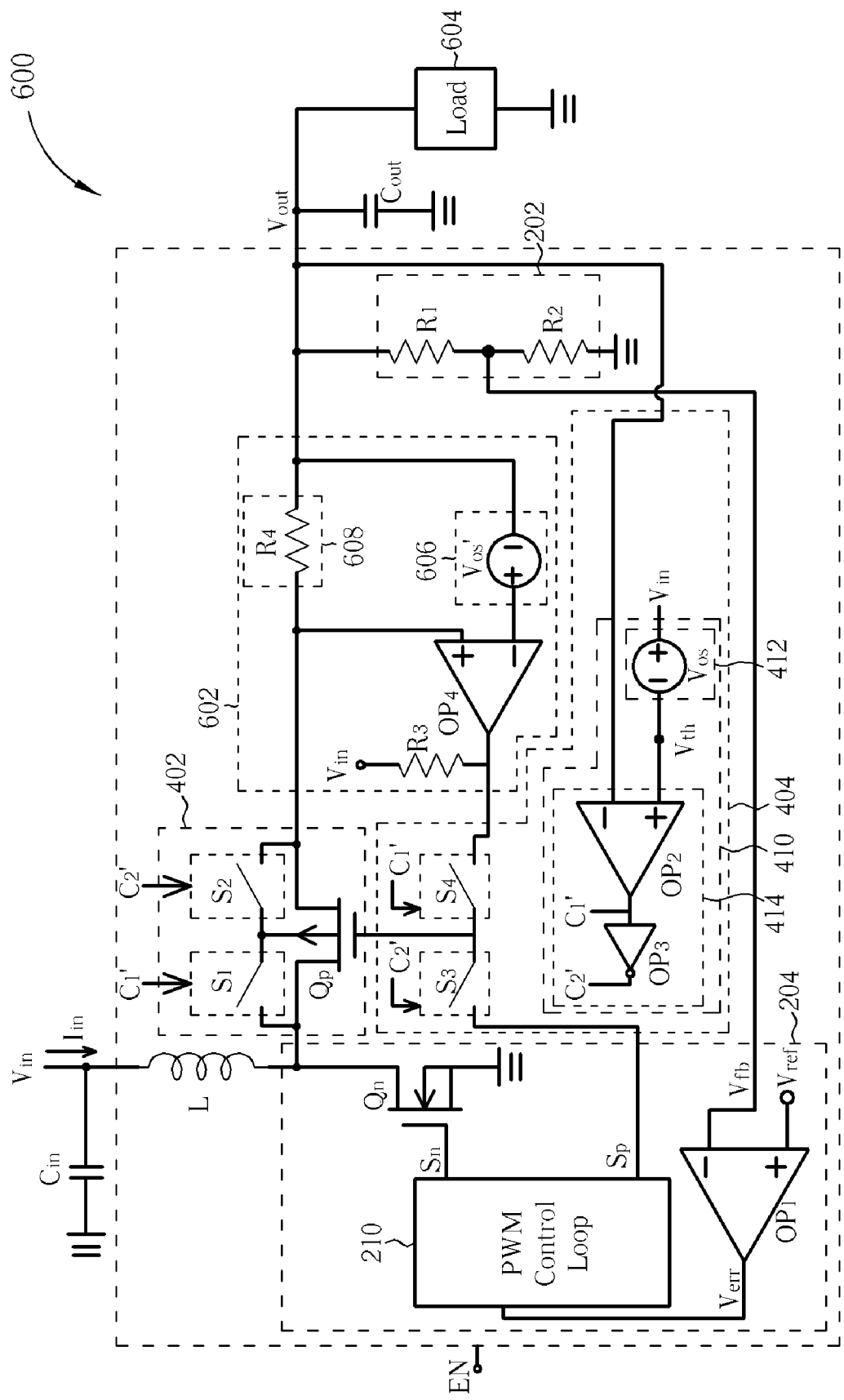
FIG. 6 is a diagram of a voltage converter according to a second embodiment of the present invention.
Figure 7:
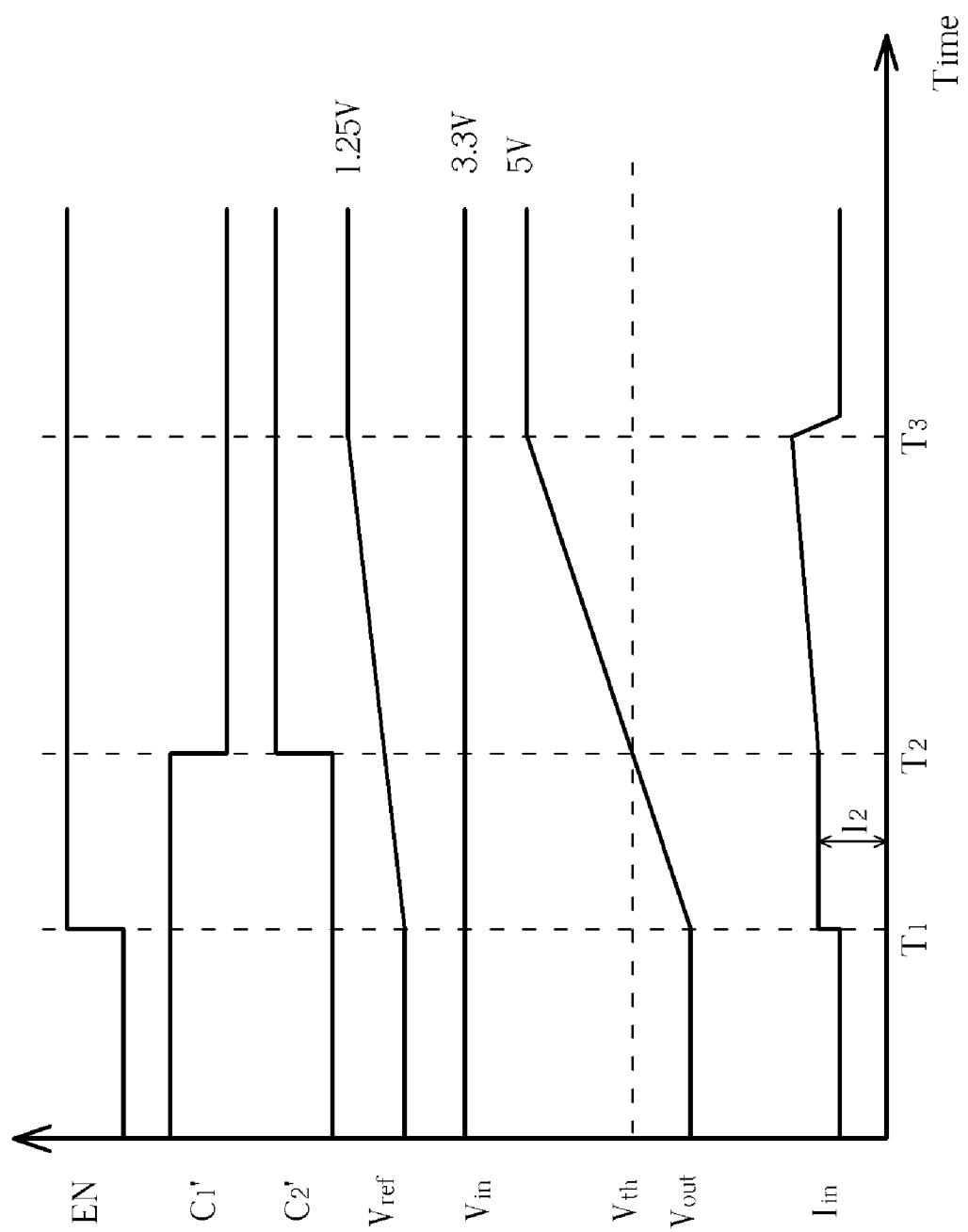
FIG. 7 is a timing diagram illustrating the operation of the voltage converter shown in FIG. 6.

Please refer to FIG. 6 and FIG. 7. FIG. 6 is a diagram of a voltage converter 600 according to a second embodiment of the present invention. FIG. 7 is a timing diagram illustrating the operation of the voltage converter 600 shown in FIG. 6. As shown in FIG. 6, the voltage converter 600 includes a feedback circuit 202, a voltage converting circuit 204, a transmission switch circuit 402, a control switch circuit 404, and a pre-bias circuit 602. The voltage converter 600 is utilized for providing a stable voltage level for the load 604. The operations and functions of the feedback circuit 202, the voltage converting circuit 204, the transmission switch circuit 402, and the control switch circuit 404 are described above, and further description is therefore not detailed here for brevity. The pre-bias circuit 602 comprises a resistor $R_3$, an offset voltage providing circuit 606, an error amplifier $OP_4$, and a resistor unit 608, wherein the operation of the resistor $R_3$ is the same as that shown in FIG. 4 and is not described here, and the resistor unit 608 in this embodiment is implemented using a resistor $R_4$ coupled between the output port of the voltage converter 600 and a drain of the first transistor $Q_p$. The offset voltage providing circuit 606 comprises an offset voltage source $V_{os}'$, and the error amplifier $OP_4$ is coupled to the resistor $R_4$ and the offset voltage providing circuit 606. The difference between the voltage converter 600 and the voltage converter 400 is operations in the pre-bias mode. The operation of the voltage converter 600 before entering the pre-bias mode and after leaving the pre-bias mode is then not repeated.

When the voltage converter 600 is started by the enable signal EN, the voltage converter 600 enters the pre-bias mode, and the voltage level of the reference voltage signal $V_{ref}$ increases with time starting from zero volts. Due to the offset voltage providing circuit 606, a voltage level of the inverting node of the error amplifier $OP_4$ is equal to the voltage level of the output voltage signal $V_{out}$ plus a voltage level of the offset voltage source $V_{os}'$, and an increased voltage signal is outputted by the offset voltage providing circuit 606. This makes the error amplifier $OP_4$ compare the increased voltage signal and a voltage level at the drain of the first transistor $Q_p$ in order to generate a control signal to control the conductance of the transmission switch circuit 402. If the difference between the voltage level at the drain of the first transistor $Q_p$ and the voltage level of the output voltage signal $V_{out}$ is higher than an offset given by the offset voltage source $V_{os}'$, the error amplifier $OP_4$ decreases the conductance of the first transistor $Q_p$ to reduce current flowing through the resistor $R_4$, thereby reducing the voltage drop across the resistor $R_4$; otherwise, if the difference between the voltage level of the drain of the first transistor $Q_p$ and the voltage level of the output voltage signal $V_{out}$ is lower than the offset given by the offset voltage source $V_{os}'$, the error amplifier $OP_4$ increases the conductance of the first transistor $Q_p$ to increase the current flowing through the resistor $R_4$, thereby increasing the voltage drop across the resistor $R_4$. Therefore, the magnitude of the current passing through the transmission switch circuit 402 can be limited to a current $I_2$ shown in FIG. 7 by the pre-bias circuit 602 in the pre-bias mode, wherein the current $I_2$ can be represented by the following equation:

$$I_2 = \frac{V_{os}'}{R_4} \qquad \text{Equation (3)}$$

Usually, the objective of designing the offset voltage source $V_{os}'$ and the resistor unit 608 (i.e. $R_4$) is to limit the current $I_2$ to such a small current that the problem caused by the voltage drop in the input voltage signal $V_{in}$ is solved. Please note that the circuit configuration of the offset voltage providing circuit 606 is only for illustrative purposes and is not meant to be a limitation of the present invention.

For example, in other embodiments, the offset voltage source $V_{os}'$ shown in FIG. 6 can be removed and another offset voltage source having an inverse voltage offset corresponding to that given by the offset voltage source $V_{os}'$ can be positioned at the non-inverting node of the error amplifier $OP_4$, wherein the offset voltage source having an inverse voltage offset is coupled between the non-inverting node of the error amplifier $OP_4$ and the drain of the first transistor $Q_p$. A decreased voltage signal is then generated by the offset voltage source having an inverse voltage offset, and this can limit the input current $I_{in}$ to a small current $I_2$ in the pre-bias mode as well. This alternative design also obeys the spirit of the present invention.

Figure 8:
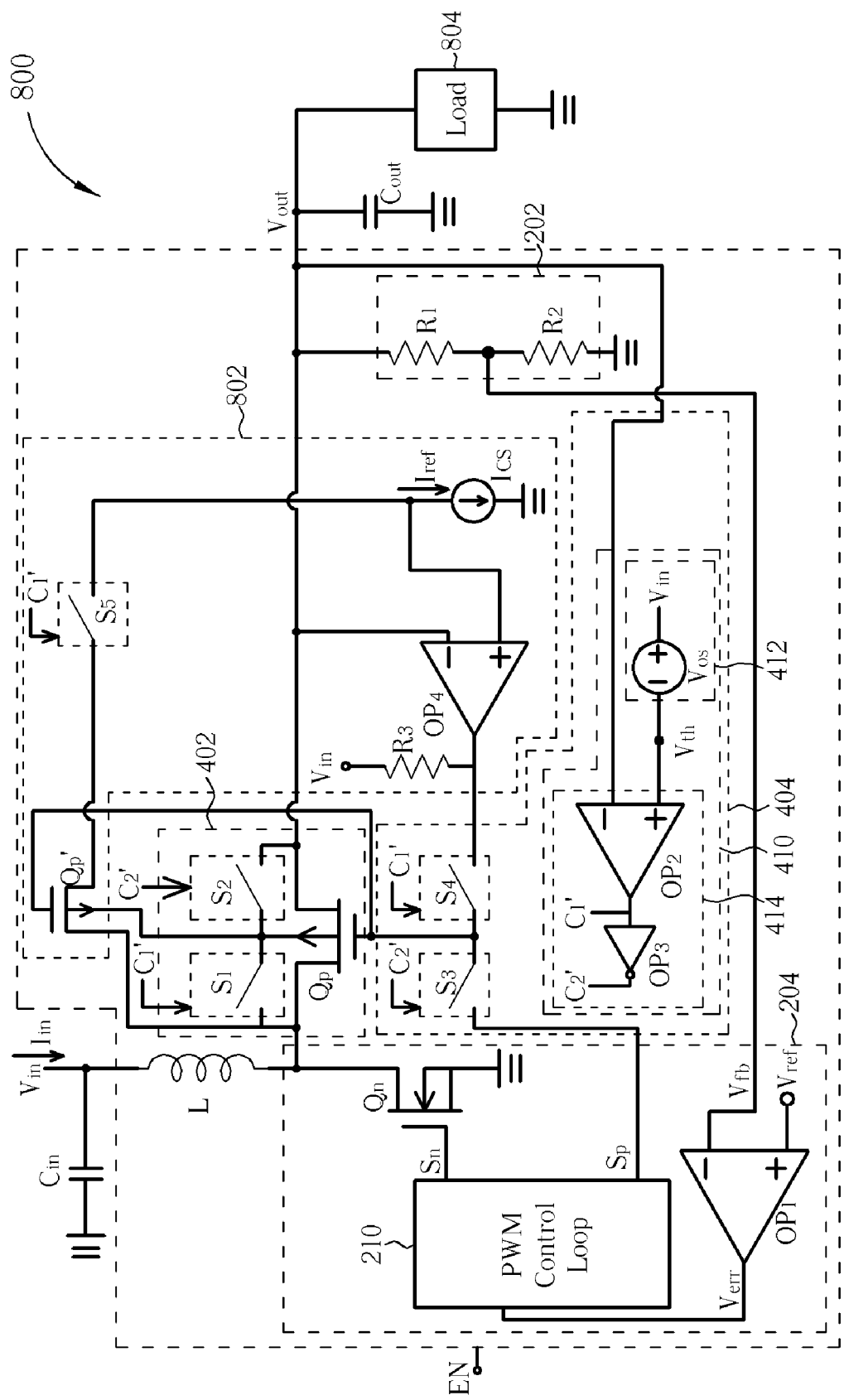
FIG. 8 is a diagram of a voltage converter according to a third embodiment of the present invention.
Figure 9:
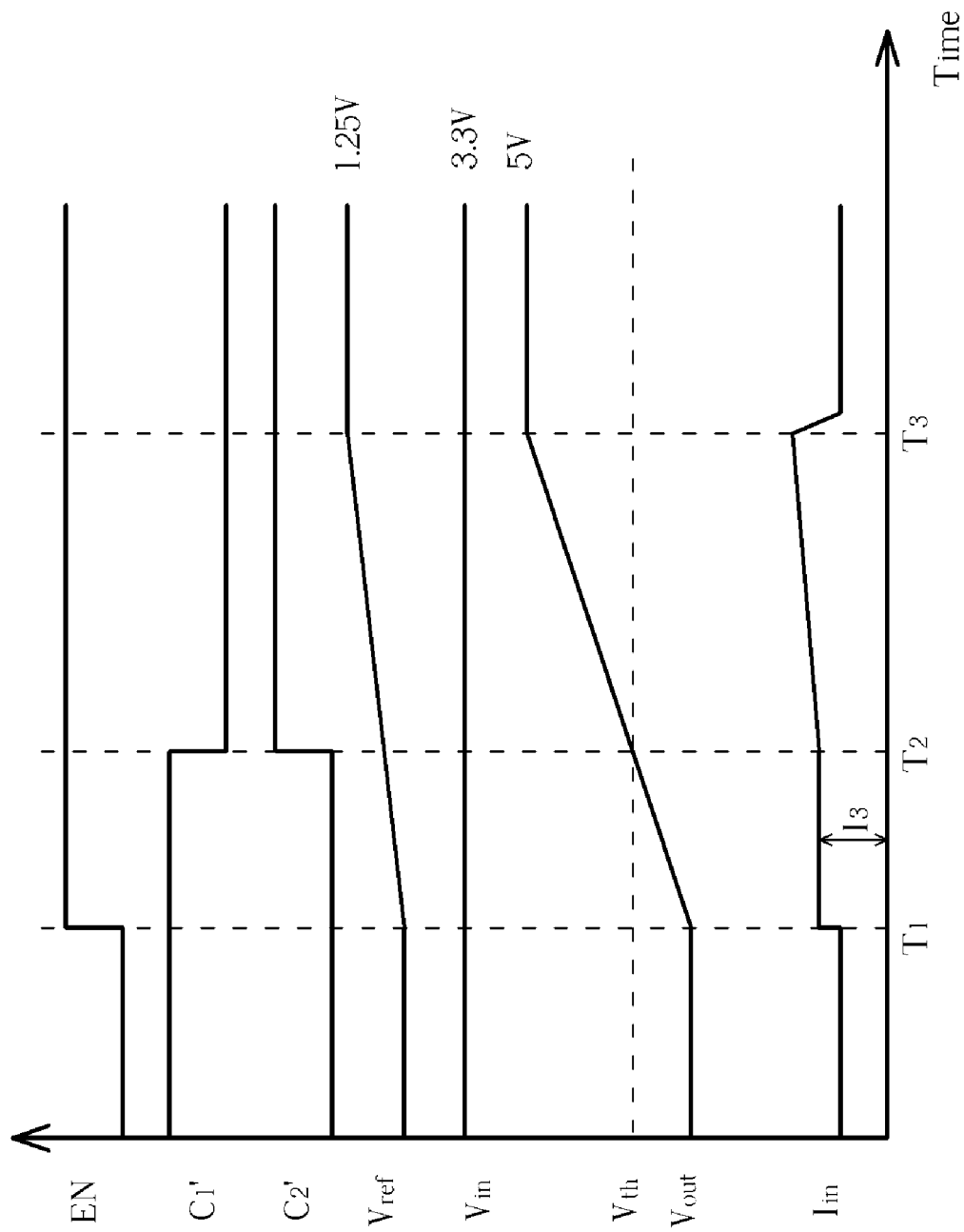
FIG. 9 is a timing diagram illustrating the operation of the voltage converter shown in FIG. 8.

Please refer to FIG. 8 and FIG. 9. FIG. 8 is a diagram of a voltage converter 800 according to a third embodiment of the present invention. FIG. 9 is a timing diagram illustrating the operation of the voltage converter 800 shown in FIG. 8. As shown in FIG. 8, the voltage converter 800 comprises a feedback circuit 202, a voltage converting circuit 204, a transmission switch circuit 402, a control switch circuit 404, and a pre-bias circuit 802. The voltage converter 800 is utilized for providing the load 804 with a stable output voltage signal $V_{out}$. The operations and functions of the feedback circuit 202, the voltage converting circuit 204, the transmission switch circuit 402, and the control switch circuit 404 are described above, and further description is not detailed here for brevity. The pre-bias circuit 802 includes a current source $I_{CS}$, a second transistor $Q_p'$, a fifth switch $S_5$, and an error amplifier $OP_4$, wherein the current source $I_{CS}$ is used for providing a reference current $I_{ref}$, and an error amplifier $OP_4$ is used for comparing voltage levels at the drains of the first and second transistors $Q_p$ and $Q_p'$ in the pre-bias mode to generate a control voltage fed into gates of the first and second transistors $Q_p$ and $Q_p'$. The fifth switch $S_5$ is controlled by the first switch control signal $C_1'$, and the status of the fifth switch $S_5$ is on in the pre-bias mode and off in the normal mode. In this embodiment, the difference between operations of the voltage converter 800 and the voltage converter 400 shown in FIG. 4 are operations in the pre-bias mode. The operations of the voltage converter 800 before entering the pre-bias mode and after leaving the pre-bias mode are not repeated for brevity. When the voltage converter 800 enters the pre-bias mode, the pre-bias circuit 802 and the first transistor $Q_p$ form a current mirror equivalently since states of first and fifth switches $S_1$ and $S_5$ remain on and status of the second switch $S_2$ remains off. The current mirror formed by the pre-bias circuit 802 and the first transistor $Q_p$ limits the first transistor $Q_p$ to pass a fixed current $I_3$, where the fixed current $I_3$ can be represented as follows:

$$I_3 = m \times I_{ref} \qquad \text{Equation (4)}$$

wherein the parameter m is a ratio of the aspect ratio of the first transistor $Q_p$ to the aspect ratio of the second transistor $Q_p'$. It should be noted that the setting of the parameter m is not a limitation of the present invention. Therefore, when the voltage level of the reference voltage signal $V_{ref}$ increases with time starting from zero volts, the output capacitor $C_{out}$ is charged with the fixed current $I_3$ until the voltage level of the output voltage signal $V_{out}$ reaches the voltage level of the threshold voltage signal $V_{th}$. The voltage converter 800 then enters the normal mode if the voltage level of the output voltage signal $V_{out}$ exceeds the threshold voltage signal $V_{th}$. The circuit configuration of providing a fixed current shown in FIG. 8 is for illustrative purposes. For example, in other embodiments, the error amplifier $OP_4$ is removed and the gate and drain of the second transistor $Q_p'$ are connected directly. A modified current mirror architecture is established and this has the capability of avoiding the large current. This alternative design also obeys the spirit of the present invention.

Figure 10:
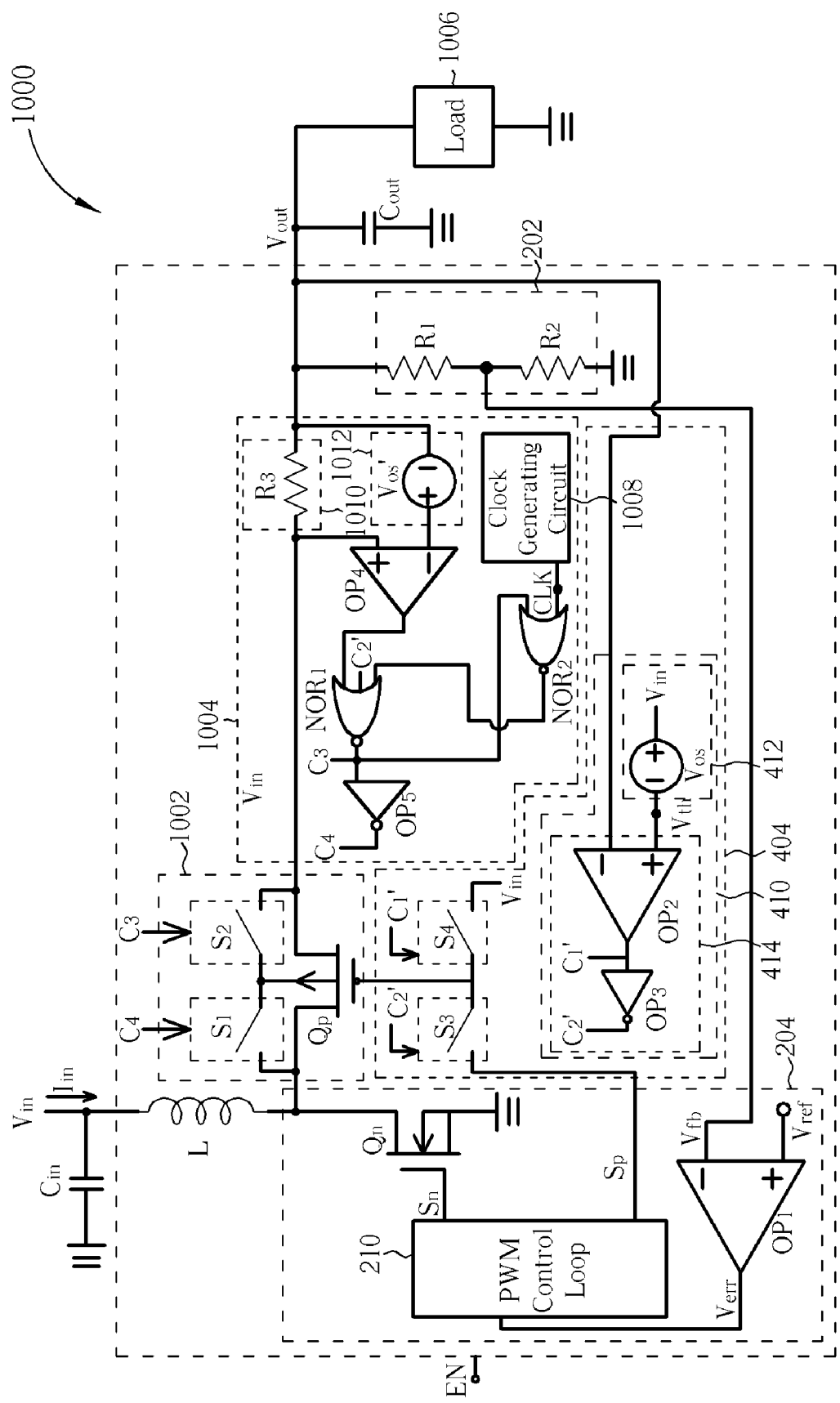
FIG. 10 is a diagram of a voltage converter according to a fourth embodiment of the present invention.

Please refer to FIG. 10. FIG. 10 is a diagram of a voltage converter 1000 according to a fourth embodiment of the present invention. As shown in FIG. 10, the voltage converter 1000 includes a feedback circuit 202, a voltage converting circuit 204, a control switch circuit 404, a transmission switch circuit 1002, and a pre-bias circuit 1004. The voltage converter 1000 is responsible for providing a load 1006 with an output voltage signal $V_{out}$. The operations and functions of the feedback circuit 202, the voltage converting circuit 204, and the control switch circuit 404 are mentioned above, and further description is omitted for brevity. The transmission switch circuit 1002 comprises a first switch $S_1$, a second switch $S_2$, and a first transistor $Q_p$, wherein statuses of the first and second switches $S_1$ and $S_2$ are controlled by a third switch control signal $C_3$ and a fourth switch control signal $C_4$ respectively. The pre-bias circuit 1004 comprises a clock generating circuit 1008, a first NOR gate $NOR_1$, a second NOR gate $NOR_2$, an inverter $OP_5$, a resistor unit 1010, an offset voltage providing circuit 1012, and a comparator $OP_4$. The clock generating circuit 1008 is used to provide a high-frequency reference clock signal CLK. The first NOR gate $NOR_1$, the second NOR gate $NOR_2$, and the inverter $OP_5$ are utilized for generating the third switch control signal $C_3$ and the fourth switch control signal $C_4$ according to an output of the comparator $OP_4$, the second switch control signal $C_2'$, and the reference clock signal CLK. The third and fourth switch control signals $C_3$ and $C_4$ are complementary to each other. In this embodiment, the resistor unit 1010 is implemented by a resistor $R_3$ and the offset voltage providing circuit 1012 includes an offset voltage source $V_{os}'$, wherein the offset voltage source $V_{os}'$ is used to increase the voltage level of the output voltage signal $V_{out}$ to generate an increased voltage signal to be fed into the inverting node of the comparator $OP_4$. The comparator $OP_4$ compares the voltage level at the drain of the first transistor $Q_p$ and the voltage level of the increased voltage signal generated by the offset voltage providing circuit 1012 to control the third and fourth switch control signals $C_3$ and $C_4$.

Figure 11:
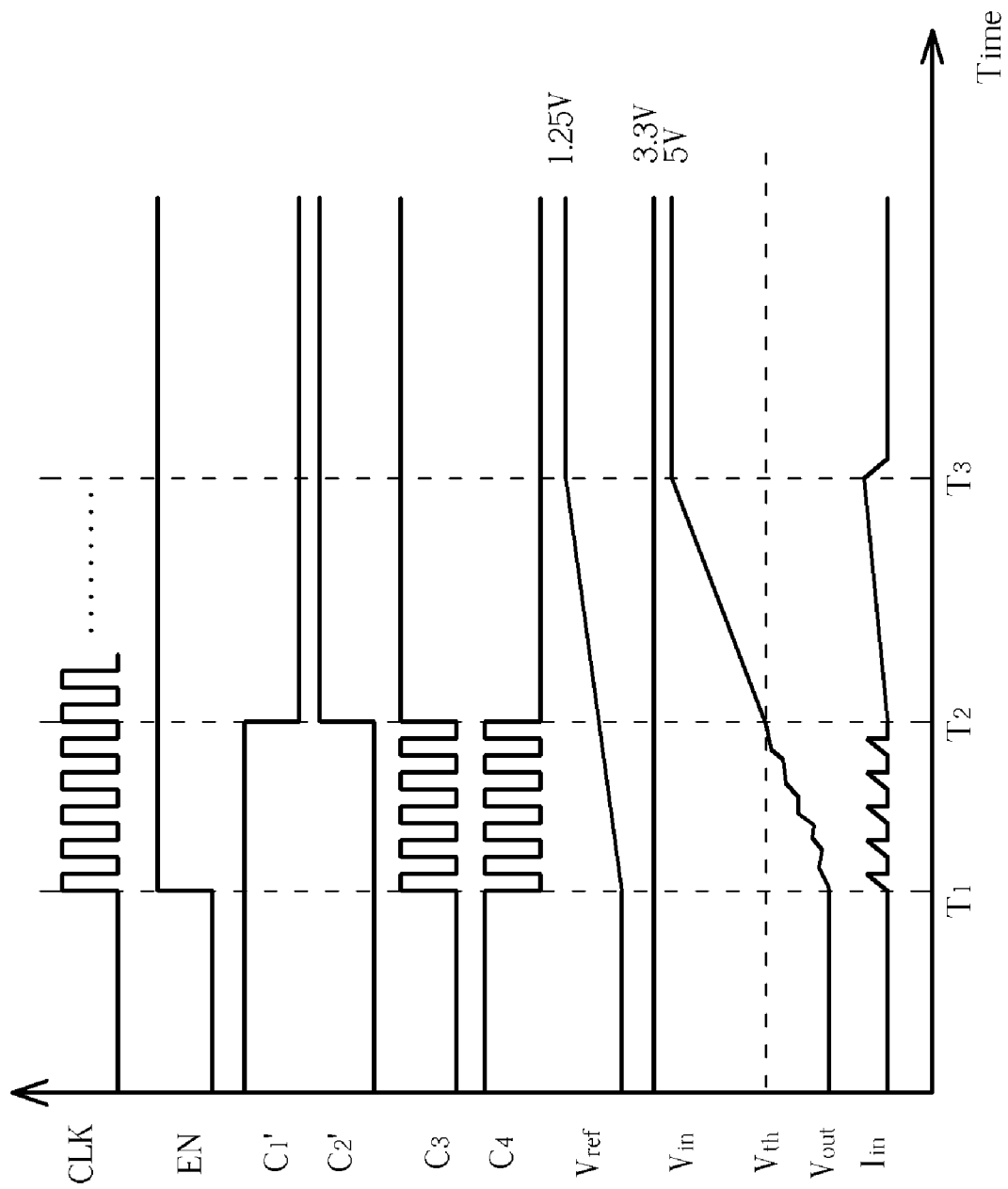
FIG. 11 is a timing diagram illustrating the operation of the voltage converter shown in FIG. 10.

Please refer to FIG. 11. FIG. 11 is a timing diagram illustrating the operation of the voltage converter 1000 shown in FIG. 10. Before the voltage converter 1000 is started, the logic level of the third switch control signal $C_3$ remains at a low logic level and the logic level of the fourth switch control signal $C_4$ remains at a high logic level. Therefore, the status of first switch $S_1$ is on, the status of the second switch $S_2$ is off, and the first transistor $Q_p$ is not conducting. When the voltage converter 1000 is enabled to enter the pre-bias mode, if the voltage level of the output of the comparator $OP_4$ and the logic level of the second switch control signal $C_2'$ are low, the logic level of the third switch control signal $C_3$ is changed according to logic levels of the reference clock signal CLK. As one can see, the logic level of the third switch control signal $C_3$ is high while the reference clock signal CLK remains at a high logic level, and the logic level of the third switch control signal $C_3$ is low while the reference clock signal CLK remains at a low logic level. On the other hand, the logic level of the fourth switch control signal $C_4$ is high while the reference clock signal CLK remains at a low logic level, and the logic level of the fourth switch control signal $C_4$ is low while the reference clock signal CLK remains at a high logic level. Therefore, the first transistor $Q_p$ is able to conduct current only when the logic level of the third switch control signal $C_3$ is high and the logic level of the fourth switch control signal $C_4$ is low, i.e. in the positive half period of the reference clock signal CLK. The current passing through the transmission switch circuit 1002 will be small as long as the frequency of the reference clock signal CLK is high enough. The reason is that the first transistor $Q_p$ will be turned off before the first transistor $Q_p$ conducts too fast. For this reason, the voltage level of the output voltage signal $V_{out}$ is increased slowly until it reaches the voltage level of the threshold voltage signal $V_{th}$, and then the voltage converter 1000 enters the normal mode. The operation of the voltage converter 1000 in the normal mode is identical to that of the voltage converter 400 (shown in FIG. 4) in the normal mode, and is not detailed for brevity. Finally, the above-mentioned problem of a serious voltage drop caused by the large inrush current can be solved.

In another embodiment, the offset voltage providing circuit 1012 is removed and another offset voltage providing circuit for decreasing the voltage level at the drain of the first transistor $Q_p$ is placed between the non-inverting node of the comparator $OP_4$ and the drain of the first transistor $Q_p$. The same goal of limiting flowing current is also achieved. This obeys the spirit of the present invention. In addition, each method of switching the status of the transmission switch circuit 1002 to prevent a large inrush current passing through the transmission switch circuit 1002 falls within the scope of the present invention.

Please note that, in above embodiments, the switch controller is utilized to generate the threshold voltage signal and to control one of the voltage converting circuit and the pre-bias circuit to control the conductance of the transmission switch circuit according to the threshold voltage signal. Any way of utilizing the pre-bias circuit to improve the prior art problem according to the threshold voltage signal also obeys the spirit of the present invention. Moreover, the implementation of the resistor unit 1010, the offset voltage providing circuit 1012, and the comparator $OP_4$ is optional. In other words, without the current limiting architecture formed by the resistor unit 1010, the offset voltage providing circuit 1012, and the comparator $OP_4$, the same objective of preventing the large sudden current from affecting the input voltage signal $V_{in}$ is achieved through using the high-frequency clock signal CLK to control the conducting of current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converter for providing an output voltage signal at an output port according to an input voltage signal, comprising:
   a feedback circuit, for generating a feedback voltage signal according to the output voltage signal;
   a transmission switch circuit, for selectively transmitting a converted voltage signal to the output port of the voltage converter in a normal mode of the voltage converter or transmitting the input voltage signal to the output port of the voltage converter in a pre-bias mode of the voltage converter;
   a voltage converting circuit, coupled to the input voltage signal, the feedback voltage signal, a reference voltage signal, and the transmission switch circuit, for converting the input voltage signal into the converted voltage signal in the normal mode and referencing the feedback voltage signal and the reference voltage signal to adjust the output voltage signal in the normal mode through controlling the transmission switch circuit;
   a pre-bias circuit, coupled to the feedback signal, the reference voltage signal, and the transmission switch circuit, for controlling a magnitude of a current passing through the transmission switch circuit to the output port in the pre-bias mode; and
   a control switch circuit, coupled to the transmission switch circuit, the voltage converting circuit, and the pre-bias circuit, for selectively allowing the voltage converting circuit to control an on/off status of the transmission switch circuit in the normal mode or the pre-bias circuit to control the on/off status of the transmission switch circuit in the pre-bias mode.

2. The voltage converter of claim 1, wherein the transmission switch circuit comprises:

a first transistor having a body, a control node, a first node, and a second node coupled to the output port;

a first switch, coupled between the body and the first node, for selectively connecting the body and the first node; and a second switch, coupled to the body and the second node, for selectively connecting the body and the second node; and the control switch circuit comprises:

a third switch, coupled between the control node and the voltage converting circuit, for selectively connecting the control node and the voltage converting circuit;

a fourth switch, coupled between the control node and the pre-bias circuit, for selectively connecting the control node and the pre-bias circuit; and a switch controller, coupled to the first, second, third, and fourth switches, for controlling on/off status of each of the first, second, third, and fourth switches, where the switch controller switches on the fourth switch and switches off the third switch in the pre-bias mode, and switches off the fourth switch and switches on the third switch in the normal mode.

3. The voltage converter of claim 2, wherein the switch controller comprises:

a threshold voltage providing circuit, for outputting a threshold voltage signal; and a switch control circuit, coupled to the threshold voltage providing circuit and the output voltage signal, for referencing the threshold voltage signal and the output voltage signal to control on/off status of each of the first, second, third, and fourth switches.

4. The voltage converter of claim 3, wherein the switch control circuit comprises:

a comparator, for comparing the threshold voltage signal and the output voltage signal to generate a first switch control signal for controlling on/off status of each of the first and fourth switches; and an inverter, coupled to the comparator, for inverting the first switch control signal to generate a second switch control signal for controlling on/off status of each of the second and third switches.

5. The voltage converter of claim 2, wherein the pre-bias circuit references the feedback voltage signal and the reference voltage signal to control the magnitude of the current passing through the transmission switch circuit.

6. The voltage converter of claim 5, wherein the pre-bias circuit comprises an error amplifier for comparing the feedback voltage signal and the reference voltage signal to generate a control signal fed into the control node of the first transistor.

7. The voltage converter of claim 2, wherein the pre-bias circuit is utilized for limiting the magnitude of the current passing through the transmission switch circuit in the pre-bias mode to equal a fixed value.

8. The voltage converter of claim 7, wherein the pre-bias circuit comprises:

a resistor unit, coupled between the second node of the first transistor and the output port of the voltage converter;

an offset voltage providing circuit, for increasing a voltage level at the output port by an offset voltage to output an increased voltage signal; and an error amplifier, coupled to the offset voltage providing circuit and the second node of the first transistor, for comparing the increased voltage signal and a voltage level at the second node to generate a control signal fed into the control node of the first transistor.

9. The voltage converter of claim 7, wherein the pre-bias circuit comprises:

a resistor unit, coupled between the second node of the first transistor and the output port of the voltage converter;

an offset voltage providing circuit, for decreasing a voltage level at the second node of the transistor by an offset voltage to output a decreased voltage signal; and an error amplifier, coupled to the offset voltage providing circuit and the output port of the voltage converter, for comparing the decreased voltage signal and the output voltage signal to generate a control signal fed into the control node of the first transistor.

10. The voltage converter of claim 2, wherein the pre-bias circuit and the first transistor form a current mirror to induce a mirrored current outputted from the transmission switch circuit to the output port of the voltage converter in the pre-bias mode.

11. The voltage converter of claim 10, wherein the pre-bias circuit comprises:

a current source, for providing a reference current;

a second transistor, having a control node coupled to the control node of the first transistor, a first node coupled to the first node of the first transistor, and a second node; and a fifth switch, coupled between the current source and the second node of the second transistor, for selectively connecting the current source and the second node of the second transistor, wherein the switch controller is further coupled to the fifth switch, for switching on the fifth switch in the pre-bias mode and for switching off the fifth switch in the normal mode.

12. The voltage converter of claim 11, wherein the pre-bias circuit further comprises:

an error amplifier, coupled to the second node of the first transistor and the fifth switch, for comparing voltage levels at the second nodes of the first and second transistors in the pre-bias mode to generate a control voltage fed into control nodes of the first and second transistors.

13. The voltage converter of claim 1, wherein the transmission switch circuit comprises:

a first transistor having a body, a control node, a first node, and a second node;

a first switch, coupled between the body and the first node, for selectively connecting the body and the first node; and a second switch, coupled to the body and the second node, for selectively connecting the body and the second node;

the control switch circuit comprises:

a third switch, coupled between the control node and the voltage converting circuit, for selectively connecting the control node and the voltage converting circuit;

a fourth switch, coupled between the control node and the pre-bias circuit, for selectively connecting the control node and the pre-bias circuit; and a switch controller, coupled to the third and fourth switches, for switching on the fourth switch and switching off the third switch in the pre-bias mode, and for switching off the fourth switch and switching on the third switch in the normal mode; wherein in the pre-bias mode the pre-bias circuit provides a predetermined voltage to the control node of the first transistor through the fourth switch and alternately switches on the first and second switches; and in the normal mode the pre-bias circuit switches on the second switch and switches off the first switch.

14. The voltage converter of claim 13, wherein the switch controller comprises:
   a threshold voltage providing circuit, for outputting a threshold voltage signal; and
   a switch control circuit, coupled to the threshold voltage providing circuit and the output voltage signal, for referencing the threshold voltage signal and the output voltage signal to control on/off status of the third and fourth switches.

15. The voltage converter of claim 14, wherein the switch control circuit comprises:
   a comparator, for comparing the threshold voltage signal and the output voltage signal to generate a first switch control signal for controlling on/off status of the fourth switch; and
   an inverter, coupled to the comparator, for inverting the first switch control signal to generate a second switch control signal for controlling on/off status of the third switch.

16. The voltage converter of claim 15, wherein the pre-bias circuit comprises:
   a clock generating circuit, for providing a reference clock signal;
   a first NOR gate, coupled to the inverter and a logic operation output, for performing a NOR operation upon the second switch control signal and the logic operation output to generate a third switch control signal for controlling on/off status of the second switch;
   a second NOR gate, coupled to the clock generating circuit and the third switch control signal, for performing a NOR operation upon the third switch control signal and the reference clock signal to generate the logic operation output; and
   an inverter, coupled to the first NOR gate, for inverting the third switch control signal to generate a fourth switch control signal for controlling on/off status of the first switch.

17. The voltage converter of claim 16, wherein the pre-bias circuit further comprises:
   a resistor unit, coupled between the second node of the first transistor and the output port of the voltage converter;
   an offset voltage providing circuit, for increasing a voltage level at the output port by an offset voltage to output an increased voltage signal; and
   a comparator, coupled to the offset voltage providing circuit and the second node of the first transistor, for comparing the increased voltage signal and a voltage level at the second node to generate a control signal;
   wherein the first NOR gate is further coupled to the comparator for performing a NOR operation upon the second switch control signal, the logic operation output, and the control signal outputted from the comparator to generate the third switch control signal.

18. The voltage converter of claim 16, wherein the pre-bias circuit further comprises:
   a resistor unit, coupled between the second node of the first transistor and the output port of the voltage converter;
   an offset voltage providing circuit, for decreasing a voltage level at the second node of the transistor by an offset voltage to output a decreased voltage signal; and
   a comparator, coupled to the offset voltage providing circuit and the output port of the voltage converter, for comparing the decreased voltage signal and the output voltage signal to generate a control signal;
   wherein the first NOR gate is further coupled to the comparator for performing a NOR operation upon the second switch control signal, the logic operation output, and the control signal outputted from the comparator to generate the third switch control signal.

19. The voltage converter of claim 1, being a boost type DC/DC voltage converter.

20. A voltage converting method for providing an output voltage signal at an output port according to an input voltage signal, comprising:
   (a) generating a feedback voltage signal according to the output voltage signal;
   (b) providing a transmission switch circuit and utilizing the transmission switch circuit for selectively transmitting a converted voltage signal to the output port in a normal mode or transmitting the input voltage signal to the output port in a pre-bias mode;
   (c) in the normal mode, converting the input voltage signal into the converted voltage signal in the normal mode and referencing the feedback voltage signal and the reference voltage signal to adjust the output voltage signal through controlling the transmission switch circuit; and
   (d) in the pre-bias mode, controlling a magnitude of a current passing through the transmission switch circuit to the output port;
   wherein the transmission switch circuit comprises:
      a first transistor having a body, a control node, a first node, and a second node coupled to the output port;
      a first switch, coupled between the body and the first node, for selectively connecting the body and the first node; and
      a second switch, coupled to the body and the second node, for selectively connecting the body and the second node;
   wherein step (c) further comprises switching on the second switch and switching off the first switch; and step (d) further comprises switching on the first switch and switching off the second switch.

21. The voltage converting method of claim 20, further comprising:
   providing a threshold voltage signal; and
   referencing the threshold voltage signal and the output voltage signal to selectively enable step (c) or step (d).

22. The voltage converting method of claim 21, wherein the step of referencing the threshold voltage signal and the output voltage signal to selectively start step (c) or step (d) comprises:
   comparing the threshold voltage signal and the output voltage signal to generate a first switch control signal for controlling on/off status of the first switch and for controlling whether step (d) is enabled; and
   inverting the first switch control signal to generate a second switch control signal for controlling on/off status of the second switch and for controlling whether step (c) is enabled.

23. The voltage converting method of claim 20, wherein step (d) comprises:
   referencing the feedback voltage signal and the reference voltage signal to control the magnitude of the current passing through the transmission switch circuit.

24. The voltage converting method of claim 23, wherein step (d) further comprises: comparing the feedback voltage signal and the reference voltage signal to generate a control signal fed into the control node of the first transistor.

25. The voltage converting method of claim 20, wherein step (d) comprises: limiting the magnitude of the current passing through the transmission switch circuit in the pre-bias mode to equal a fixed value.

26. The voltage converting method of claim 25, wherein step (d) further comprises:
providing a resistor unit, coupled between the second node of the first transistor and the output port of the voltage converter;
increasing a voltage level at the output port by an offset voltage to output an increased voltage signal; and
comparing the increased voltage signal and a voltage level at the second node to generate a control signal fed into the control node of the first transistor.

27. The voltage converting method of claim 25, wherein step (d) further comprises:
providing a resistor unit, coupled between the second node of the first transistor and the output port of the voltage converter;
decreasing a voltage level at the second node of the transistor by an offset voltage to output a decreased voltage signal; and
comparing the decreased voltage signal and the output voltage signal to generate a control signal fed into the control node of the first transistor.

28. The voltage converting method of claim 20, wherein step (d) comprises: forming a current mirror to induce a mirrored current outputted from the transmission switch circuit to the output port.

29. A voltage converting method for providing an output voltage signal at an output port according to an input voltage signal, comprising:
(a) generating a feedback voltage signal according to the output voltage signal;
(b) providing a transmission switch circuit and utilizing the transmission switch circuit for selectively transmitting a converted voltage signal to the output port in a normal mode or transmitting the input voltage signal to the output port in a pre-bias mode;
(c) in the normal mode, converting the input voltage signal into the converted voltage signal in the normal mode and referencing the feedback voltage signal and the reference voltage signal to adjust the output voltage signal through controlling the transmission switch circuit; and
(d) in the pre-bias mode, controlling a magnitude of a current passing through the transmission switch circuit to the output port;
wherein the transmission switch circuit comprises:
a first transistor having a body, a control node, a first node, and a second node;
a first switch, coupled between the body and the first node, for selectively connecting the body and the first node; and
a second switch, coupled to the body and the second node, for selectively connecting the body and the second node;
wherein step (d) comprises: providing a predetermined voltage to the control node of the first transistor and alternately switching on the first and second switches; and step (c) comprises: switching on the second switch and switching off the first switch.

30. The voltage converting method of claim 29, further comprising:
providing a threshold voltage signal; and
referencing the threshold voltage signal and the output voltage signal to selectively enable step (c) or step (d).

31. The voltage converting method of claim 30, wherein the step of referencing the threshold voltage signal and the output voltage signal to selectively enable step (c) or step (d) comprises:
comparing the threshold voltage signal and the output voltage signal to generate a first switch control signal for controlling whether step (d) is enabled; and
inverting the first switch control signal to generate a second switch control signal for controlling whether step (c) is enabled.

32. The voltage converting method of claim 31, wherein step (d) comprises:
providing a reference clock signal;
performing a NOR operation upon the second switch control signal, a control signal, and a logic operation output to generate a third switch control signal for controlling on/off status of the first switch;
performing a NOR operation upon the third switch control signal and the reference clock signal to generate the logic operation output; and
inverting the third switch control signal to generate a fourth switch control signal for controlling on/off status of the second switch.

33. The voltage converting method of claim 32, wherein step (d) further comprises:
providing a resistor unit, coupled between the second node of the first transistor and the output port of the voltage converter;
increasing a voltage level at the output port by an offset voltage to output an increased voltage signal; and
comparing the increased voltage signal and a voltage level at the second node to generate a control signal;
wherein the step of generating the third switch control signal comprises performing a NOR operation upon the second switch control signal, the logic operation output, and the control signal to generate the third switch control signal.

34. The voltage converting method of claim 32, wherein step (d) further comprises:
providing a resistor unit, coupled between the second node of the first transistor and the output port of the voltage converter;
decreasing a voltage level at the second node of the transistor by an offset voltage to output a decreased voltage signal; and
comparing the decreased voltage signal and the output voltage signal to generate a control signal;
wherein the step of generating the third switch control signal comprises performing a NOR operation upon the second switch control signal, the logic operation output, and the control signal outputted from the error amplifier to generate the third switch control signal.

* * * * *